US006798402B1

(12) United States Patent
Takano et al.

(10) Patent No.: US 6,798,402 B1
(45) Date of Patent: Sep. 28, 2004

(54) RECEIVED-LIGHT PATTERN DETECTION APPARATUS

(75) Inventors: Junichi Takano, Tokyo (JP); Isamu Kubota, Tokyo (JP)

(73) Assignee: Namco, Ltd., Tokyo (JP)

( * ) Notice: Subject to any disclaimer, the term of this patent is extended or adjusted under 35 U.S.C. 154(b) by 124 days.

(21) Appl. No.: 09/709,443

(22) Filed: Nov. 13, 2000

(30) Foreign Application Priority Data

Nov. 24, 1999 (JP) .......................................... 11-332281

(51) Int. Cl.[7] .............................................. G09G 5/00
(52) U.S. Cl. ...................................... 345/173; 345/175
(58) Field of Search ................................. 345/158, 161, 345/170, 173, 174, 175, 176, 177, 183, 156, 157, 99, 100, 82, 81; 347/19; 385/88, 89, 92, 93, 136; 438/65

(56) References Cited

U.S. PATENT DOCUMENTS

| | | | | |
|---|---|---|---|---|
| 4,267,443 A | | 5/1981 | Carroll et al. ............... 250/221 |
| 4,384,201 A | | 5/1983 | Carroll et al. ............... 250/221 |
| 4,672,558 A | | 6/1987 | Beckes et al. ............... 364/518 |
| 4,680,429 A | * | 7/1987 | Murdock et al. ......... 178/20.02 |
| 4,684,801 A | | 8/1987 | Carroll et al. ............... 250/221 |
| 4,970,545 A | * | 11/1990 | Inagawa ....................... 355/45 |
| 5,414,413 A | | 5/1995 | Tamaru et al. .............. 345/175 |
| 5,454,043 A | | 9/1995 | Freeman ..................... 382/168 |
| 5,621,437 A | * | 4/1997 | Jeong .......................... 345/173 |
| 5,825,352 A | * | 10/1998 | Bisset et al. ................ 345/173 |
| 6,237,106 B1 | * | 5/2001 | Koyama et al. ............ 713/502 |
| 6,308,203 B1 | * | 10/2001 | Itabashi et al. ............. 709/217 |
| 6,450,888 B1 | * | 9/2002 | Takase et al. ................ 463/43 |
| 6,608,642 B1 | * | 8/2003 | Omae ......................... 347/237 |

FOREIGN PATENT DOCUMENTS

| | | | | |
|---|---|---|---|---|
| EP | 0 366 913 A3 | | 5/1990 | |
| EP | 0 372 964 A | * | 6/1990 | ........... G06K/11/08 |
| GB | 2359233 A | | 4/1981 | |
| GB | 2359623 A | | 8/2001 | |
| JP | Sho 57-211637 | | 6/1981 | |
| JP | Sho 62-005428 | | 1/1987 | |
| JP | 02-171979 | | 7/1990 | ............ G06K/9/46 |
| JP | Hei 11-184618 | | 12/1997 | |
| JP | 2945870 | | 1/1998 | |
| JP | Hei 11-213161 | | 1/1998 | |
| JP | 2849101 | | 11/1998 | |
| JP | 2941207 | | 6/1999 | |
| WO | WO 99/50735 | | 10/1999 | |

OTHER PUBLICATIONS

Search Report, United Kingdom Patent Office, Jun. 12, 2001.

Official Action in the British patent application dated Jul. 25, 2003.

* cited by examiner

*Primary Examiner*—Bipin Shalwala
*Assistant Examiner*—Mansour M. Said
(74) *Attorney, Agent, or Firm*—Miles & Stockbridge PC; James T. Carmichael; Jason H. Vick

(57) ABSTRACT

There is provided a received-light pattern detection apparatus capable of reading received-light pattern data within a period of time shorter than a read interval of a video game, including a transfer time. A received-light pattern detection apparatus for detecting a received-light pattern representing the position of an object on the front surface of a monitor includes a detection section having photo-couplers arranged around the periphery of the monitor and a plane detection surface formed from the photo-couplers; timing control circuits for controlling a driving timing of the detection section; a read control circuit formed by means of connecting the timing control circuits in the form of a cascade; and an input/output interface for converting the received-light pattern data read from the read control circuit into a switch packet and transmitting the switch packet.

3 Claims, 6 Drawing Sheets

FREEZE

RECEIVED-LIGHT PATTERN DETECTION APPARATUS

BACKGROUND OF THE INVENTION

1. Field of the Invention

The present invention relates to a received-light pattern detection apparatus for detecting, as a received-light pattern and in a non-contact manner, the trail of a moving object.

2. Description of the Background Art

The present applicant has proposed a hand-input-type game system which perceives a sign from the motion of a hand or finger of a game player and which attacks an enemy character displayed on a game screen or controls the motions of game characters according to the input sign.

Such a game system requires a received-light pattern detection apparatus for detecting a received-light pattern corresponding to the position of a finger or hand of a game player on a two-dimensional planar surface formed on the front surface of a monitor and which transports the thus-received received-light pattern to a video game board.

The present applicant proposes a scanning apparatus as the received-light pattern detection apparatus. In the scanning apparatus, photo-couplers, each consisting of a light-emitting diode and a light-receiving element, are two-dimensionally arranged at given intervals, thus constituting a detection plane (hereinafter simply called a "detection plane"). The light-emitting diodes are sequentially illuminated, whereby a received-light pattern is output form the light-receiving elements.

In a case where one hundred and twelve photo-couplers are provided on the front surface of a 29-inch monitor, since the time required for reading a received-light pattern from a single photo-coupler assumes a value of 200 μsec, a time of 22.4 msec. is required for reading received-light patterns from all the photo-couplers. This read time is longer than a read interval of a video game (i.e., 16.6 msec.)

The received-light pattern detection apparatus proposed by the present applicant is required to shorten a per-scan read time including a transfer time, so as to become less than the read interval of a video game.

SUMMARY OF THE INVENTION

The present invention has been conceived in light of the foregoing requirement and is aimed at providing a received-light pattern detection apparatus which can read received-light patterns within a read interval of a video game, including a transfer time.

The above objects of the present invention are achieved by a received-light pattern detection apparatus for detecting a received-light pattern representing the position of an object existing in front of a monitor. The apparatus includes a detection section having photo-couplers arranged around the periphery of the monitor. The photo-couplers form a planar detection surface in front of the monitor. Timing control circuits are provided to the apparatus for controlling a driving timing of the detection section. A read control circuit is formed in the apparatus by means of connecting the timing control circuits in the form of a cascade. The apparatus also includes an input/output interface for converting the received-light pattern data read from the read control circuit into a switch packet arid transmitting the switch packet.

Other objects and further features of the present invention will be apparent from the following detailed description when read in conjunction with the accompanying drawings.

DESCRIPTION OF THE PREFERRED EMBODIMENTS

A preferred embodiment of the present invention will be described hereinbelow by reference to the accompanying drawings. Several example signs will first be described before description of the received-light pattern detection apparatus according to the embodiment, thus explaining the outline of an input operation to be performed by a game player.

Figure 6:
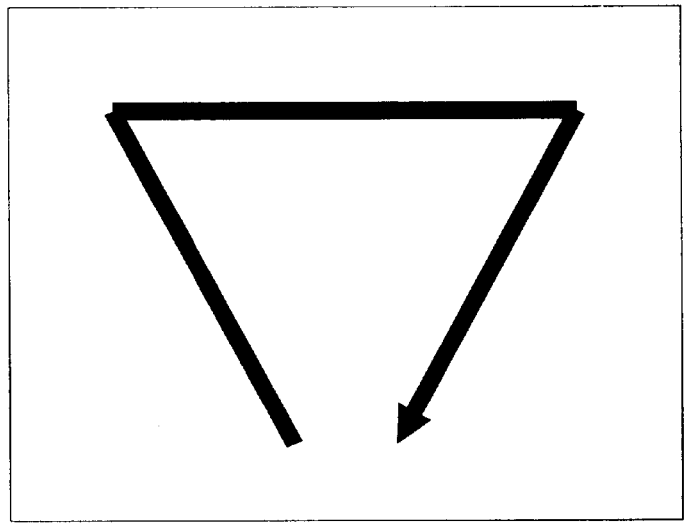
FIG. 6 is an illustration of a sign representing attack magic FREEZE.

FIG. 6 is an illustration of a sign representing "attack magic FREEZE." This sign is entered by means of a game player standing in front of a monitor 1 and moving his finger so as to link three straight lines by a single stroke. Thus, the game player sends a video game board instruction to practice magic of freezing attribute.

After having entered a sign representing the attack magic described in connection with reference to FIG. 6, the game player specifies a target to be attacked by the at tack magic. As a result, magic of attribute specified by entry of a sign is practiced on the target.

Figure 7:
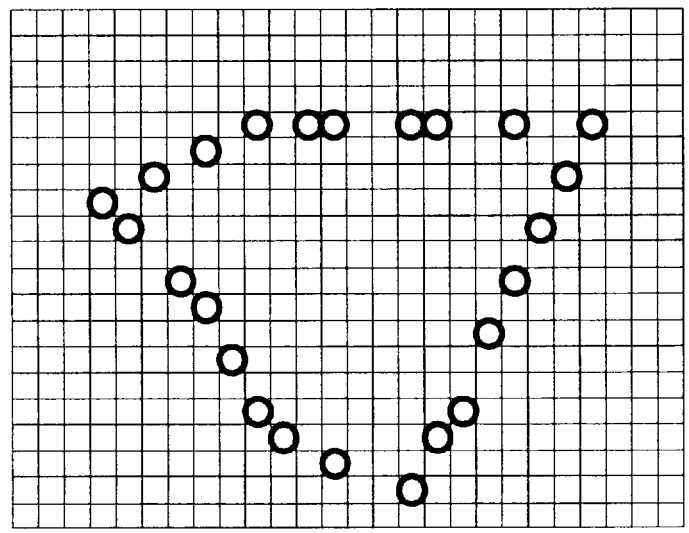
FIG. 7 is an illustration showing an example of received-light pattern data.

FIG. 7 is an illustration showing an example of received-light pattern data. The received-light pattern data shown in FIG. 7 are produced by reading the sign shown in FIG. 6 by means of a single scanning operation. The received-light pattern is displayed on the basis of the OFF state of the photo-couplers arranged in both longitudinal and lateral directions.

Figure 1:
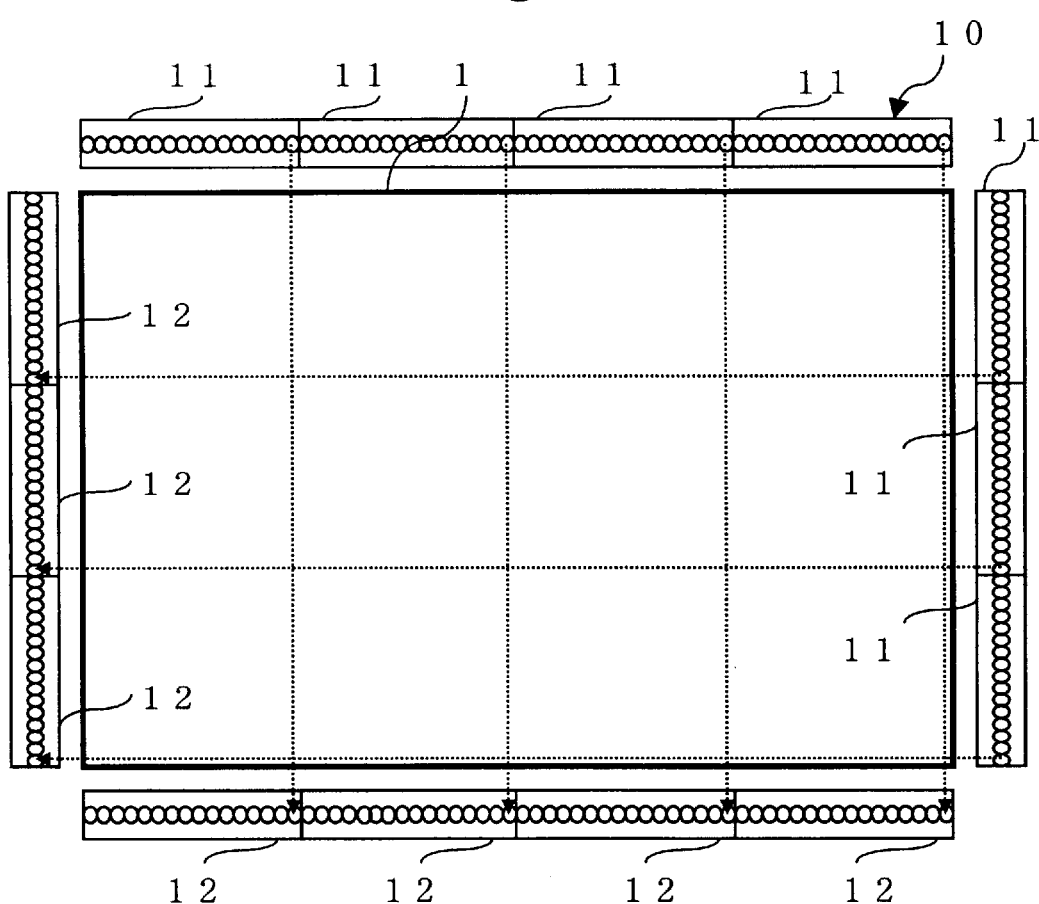
FIG. 1 is an illustration showing the received-light pattern detection apparatus when it is provided on a monitor.

The received-light pattern detection apparatus for detecting the entry of a sign performed by the game player will now be described by reference to FIG. 1. FIG. 1 is an illustration showing the received-light pattern detection apparatus when it is provided on a monitor 1.

The received-light pattern detection apparatus 10 traces, in a non-contact manner, the motion of a hand or finger of a game player standing opposite the monitor 1 as mentioned above and reads data pertaining to the coordinates of the player's finger during a read interval of a video game.

The received-light pattern detection apparatus 10 is formed on the front surface of the monitor 1 as shown in FIG. 1. Three light-emitting modules 11 are linearly provided in the vicinity of one shorter side of the front surface of the monitor 1 while three light-receiving modules 12 are linearly provided in the vicinity of the other shorter side of the front surface of the monitor 1. Further, four light-emitting modules 11 are linearly provided in the vicinity of one longer side of the front surface of the monitor 1 while four light-receiving modules 12 are linearly provided in the vicinity of the other longer side of the front surface of the monitor 1. The light-emitting modules 11 are arranged opposite the light-receiving modules 12, thereby constituting photo-coupler modules. The photo-coupler modules constitute a rectangular detection plane.

Since the monitor 1 has a 29-inch screen, the detection plane is formed to have a size sufficiently covering the 29-inch screen.

In the light-emitting module 11, 16 light-emitting diodes are arranged at an interval of 10.28 mm. In the light-receiving module 12, 16 light-receiving elements are arranged at an interval of 10.28 mm. The light-emitting diode emits light at the wavelength of an infrared ray.

The light-emitting modules 11 and the light-receiving modules 12 are arranged at an uniform interval of 10.28 mm for the following two reasons. First, there is ensured an interval for preventing occurrence of interference between infrared rays originating from the light-emitting diodes. Second, a human finger usually has a width of about 10 mm when the tip is pressed against a screen. In order to enable detection of the position of a finger on a planar surface formed over the front surface of the monitor 1, the interval between modules is made wider than the width of the human finger, thus detecting a single finger without fail through use of two sets of photo-couplers provided in both the longitudinal and lateral directions.

Figure 2:
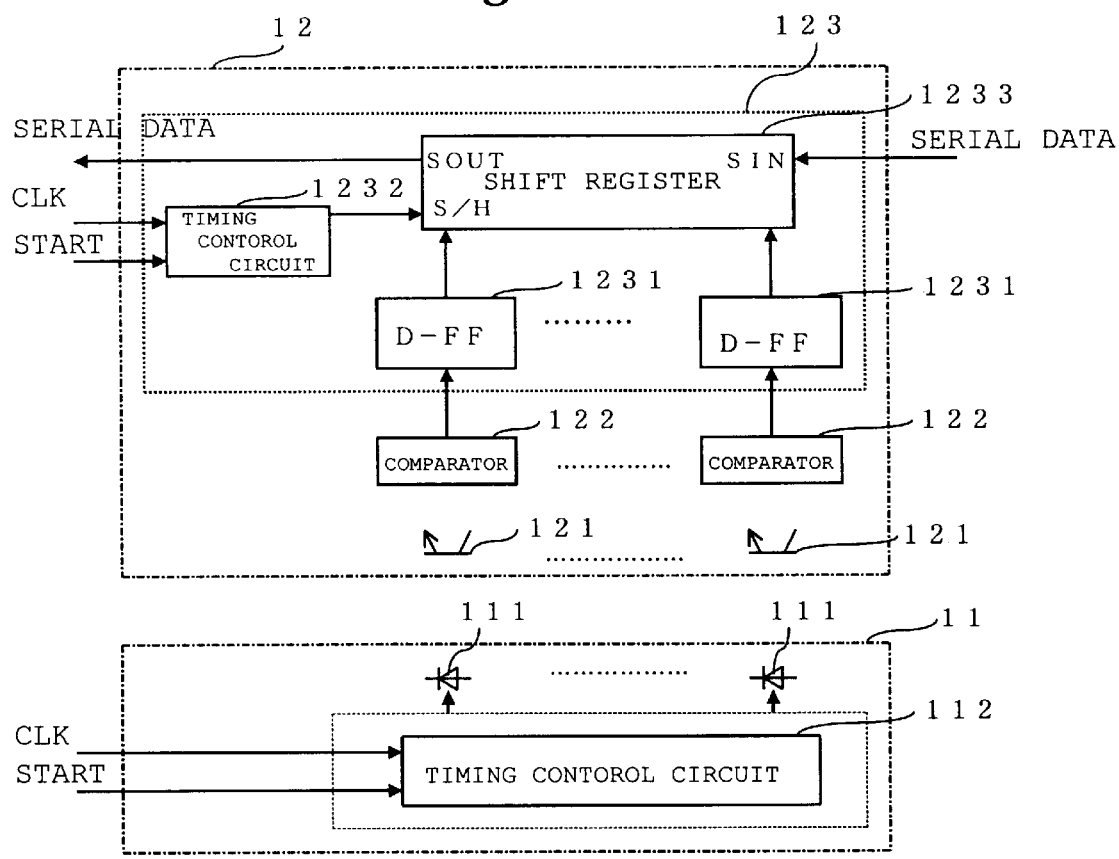
FIG. 2 is a block diagram showing the circuit configuration of a photo-coupler module.
Figure 3:
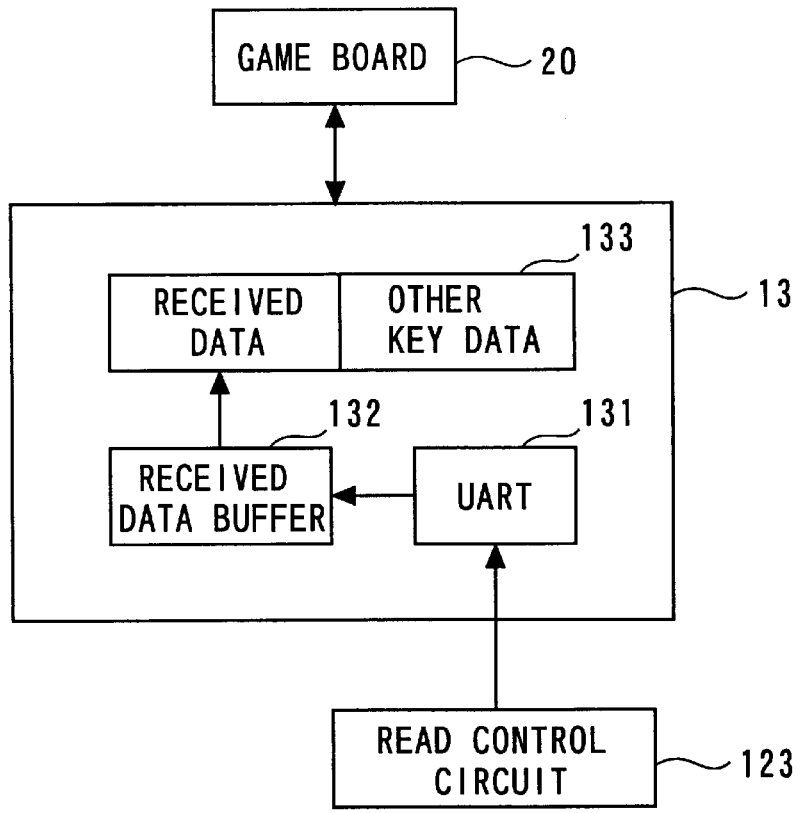
FIG. 3 is a block diagram schematically showing the configuration of an I/O circuit.

The circuit configuration of the received-light pattern detection apparatus 10 according to the present embodiment will now be described by reference to FIGS. 2 and 3. FIG. 2 is a block diagram showing the circuit configuration of a photo-coupler module. FIG. 3 is a block diagram schematically showing the configuration of an I/O circuit.

The received-light pattern detection apparatus 10 includes a circuit which comprises a plurality of light-emitting modules 11 connected to a plurality of light-receiving modules 12 through a cascade connection, and an I/O circuit 13 (see FIG. 3). The circuit takes the states of respective photo-couplers included in those modules as one hundred and twelve digital switch inputs for transmitting serial data by means of JV communication.

As mentioned above, each photo-coupler module consists of the light-emitting module 11 and the light-receiving module 12. As shown in FIG. 2, the light-emitting module 11 comprises sixteen light-emitting diodes 111 and a timing control circuit 112. As illustrated, the light-receiving module 12 consists of sixteen light-receiving elements 121, sixteen voltage comparators 122, and a read control circuit 123. The read control circuit 123 comprises sixteen D-FF elements 1231, a timing control circuit 1232, and a shift register 1233. A serial input port is provided to the shift register 1233 so that the number of sensor terminals can be increased by means of connecting another read control circuit 123 having the same function thereto. In the present embodiment, seven sets of photo-coupler modules are connected by means of a cascade connection. (See FIG. 8)

The I/O circuit 13 is an I/O interface for establishing JVS communication between a game board and the received light pattern detection apparatus 10. The I/O circuit 13 outputs a start clock, thus commencing a reading operation. The I/O circuit 13 reads by way of a serial port received-light pattern data of one hundred and twelve bits transferred from the read control circuit 123 and transfers the received-light pattern data after having converted the data so as to comply with a format for JV communication.

The I/O circuit 13 is embodied as a one-chip microcomputer. As shown in FIG. 3, the I/O circuit 13 has an UART function, a received data buffer function, and a key data packet function. Upon receipt of a request, the I/O circuit 13 produces a start pulse and copies the data stored in the received data buffer 132 to a specified position in the key data packet 133. After completion of copying of the data, the I/O circuit 13 clears and resets the received data buffer 132.

The UART 131 is a serial interface and is connected to the read control circuit 123 for receiving received-light pattern data.

The received data buffer 132 temporarily retains the received-light pattern data read from the read control circuit 123.

In response to a request output from a host, the key data packet 133 converts the received-light pattern data and other key data into a switch packet.

Up to this point the outline of configuration of the received-light pattern detection apparatus according to the present embodiment has been described. A communication protocol for establishing communication between the received-light pattern detection apparatus 10 and the game board as well as a reading operation of the received-light pattern detection apparatus 10 will now be described by reference to FIGS. 4 and 5.

Figure 4:
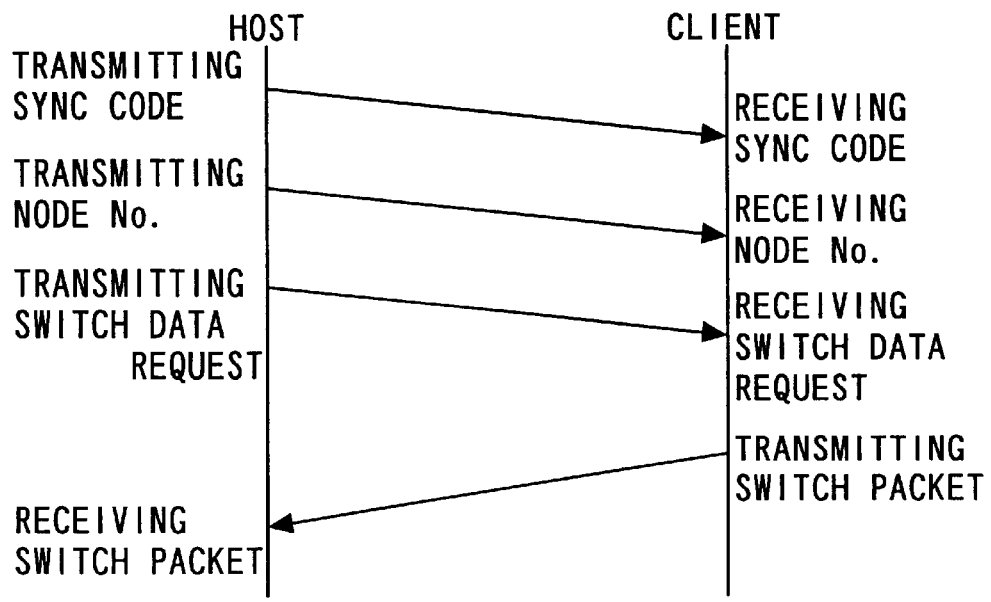
FIG. 4 is a conceptual drawing showing a JVS communication protocol.

FIG. 4 is a conceptual drawing showing a JVS communication protocol. In FIG. 4, a host represents a game board 20, and a client represents the I/O circuit 13.

The game board 20 transmits a SYNC code to the I/O circuit 13, and the I/O circuit 13 receives the SYNC code.

Subsequently, the game board 20 transmits a node number to the I/O circuit 13, and the I/O circuit 13 receives the node number.

The game board 20 transmits a switch data request to the I/O circuit 13. The I/O circuit 13 receives the switch data request. The I/O circuit 13 determines whether or not the switch data request has been directed to itself. If it is determined that the request has not been directed to itself, the I/O circuit 13 remains a standby state until receiving the next SYNC code.

In contrast, the circuit 13 performs a data transmission operation when determining that the request has been output to itself. Upon receipt of the switch data request output from the game board 20, the I/O circuit 13 converts the data stored in the received data buffer 132 into a switch packet and sends the switch packet to the game board 20. As a result, the game board 20 receives one hundred and twelve bits of received-light pattern data.

During a period of time from when sending the switch packet until receiving the next SYNC code. the I/O circuit 13 outputs a start pulse, captures latch data from the light-receiving module 12, and completes writing of the latch data into the received data buffer 132.

The operation of the received-light pattern detection apparatus 10 will now be described by reference to FIGS. 5A to 5K. FIGS. 5A to 5K are timing charts showing signals appearing in a photo-coupler module.

Figure 5A:
FIGS. 5A to 5K are timing charts showing signals appearing in a photo-coupler module.

FIG. 5A shows the timing of a start clock signal. As mentioned above, the I/O circuit 13 produces a start clock signal in response to the request output from the game board 20. The start clock signal is delivered to the timing control circuit 112 of the light-emitting module 11 and to the timing control circuit 1232 of the light-receiving module 12. Accordingly, the timing control circuit 112 and the timing control circuit 1232 start operations simultaneously. Here, symbol CLK designates an operation clock signal to be sent to timing circuits 112 and 1232.

Figure 5B:
Figure 5C:
Figure 5D:
Figure 5E:

FIGS. 5B to 5E show light-emission timings of the light-emitting diode 111. FIG. 5B shows the first light-emission timing; FIG. 5C shows the light-emission timing at which the second element is to be illuminated; FIG. 5D shows the light-emission timing at which the 15th element is to be illuminated; and FIG. 5E shows the 16th light-emission timing.

The timing control circuit 112 commences its operation in accordance with the start clock signal and sequentially illuminates the sixteen elements of the light-emitting diode 111 at control timings shown in FIGS. 5B to 5E.

Figure 5F:
Figure 5G:
Figure 5H:
Figure 5I:

FIGS. 5F to 5I show latch timings of the light-receiving module 12. FIG. 5F shows the first latch timing at which data obtained from the amount of light emitted at the timing shown in FIG. 5B is latched; FIG. 5G corresponds to FIG. 5C, FIG. 5H corresponds to FIG. 5D; and FIG. 5I corresponds to FIG. 5E.

The timing control circuit 1232 commences an operation in response to the start clock signal. The sixteen D-FF elements 1231 latch a signal output from the light-receiving element 121 at timings shown in FIGS. 5F to 5I.

Figure 5J:
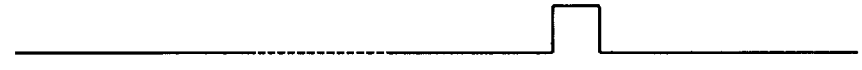

FIG. 5J shows the timing at which an S/H signal is to be output. The S/H signal is output at a point in time when the timing control circuit 1232 has counted up sixteen CLK signals from the trailing edge of the start signal. The shift register 1233 commences transfer of latch data at the output timing of the S/H signal.

Figure 5K:
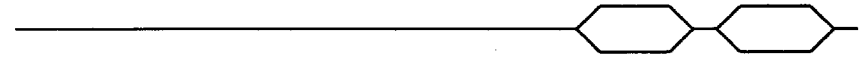

FIG. 5K shows transfer of latch data. Upon receipt of the S/H signal shown in FIG. 5J, the shift register 1233 read the data latched by the sixteen D-FF elements 1231 and transmits the thus-read data in an asynchronous serial format from an output terminal SOUT.

After the shift register 1233 has finished latching the received-light data from the 16th element, the timing control circuit 1232 inhibits capturing of latch data until receiving the next start clock signal. In other words, until receiving an input of the next start clock signal, the shift register 1233 outputs received-light pattern data from a serial output terminal SOUT in a synchronous serial format in response tog a signal input to the serial input terminal SIN.

Figure 8:
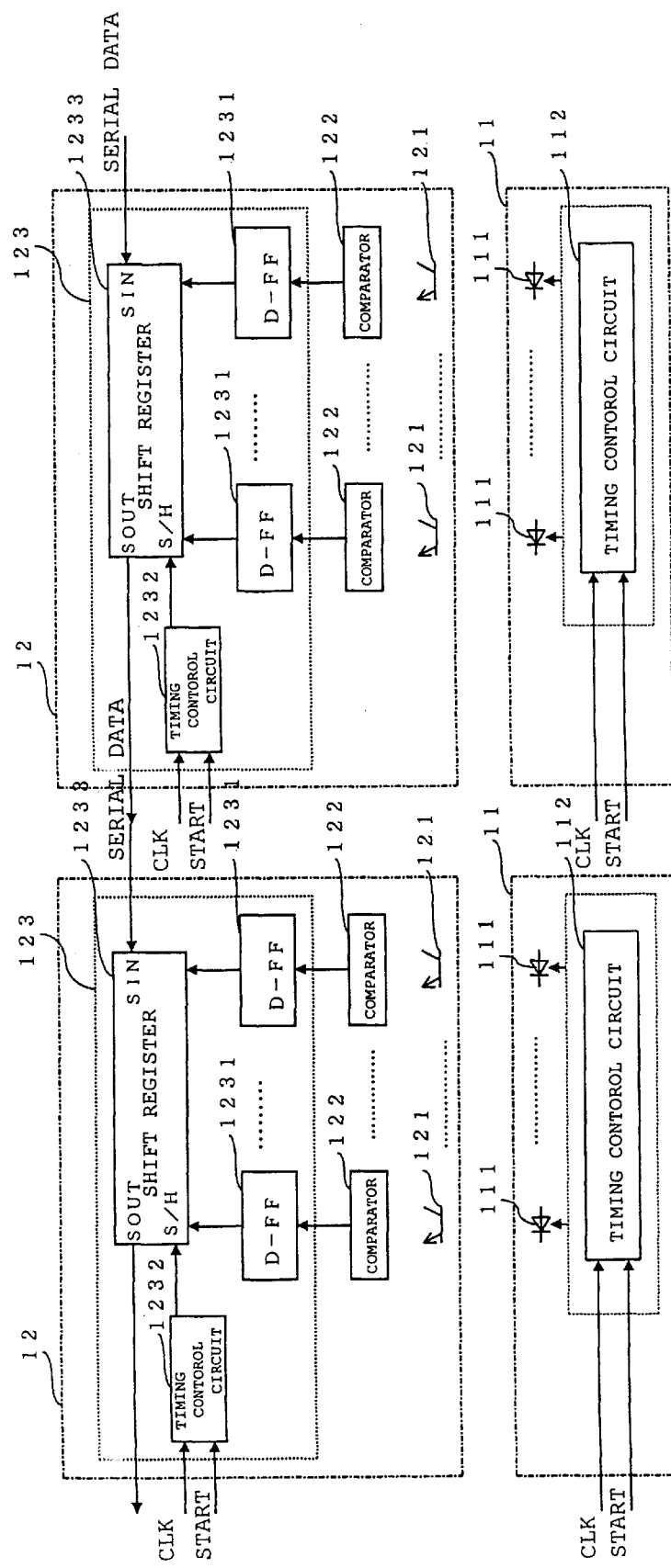
FIG. 8 is a block diagram showing the circuit configuration of a cascaded photo-coupler module.

Up to this point the operation timing of the photo-coupler module has been described. The received-light pattern detection apparatus according to the present embodiment can serially capture received-light pattern data from respective photo-coupler modules in the sequence in which the photo-coupler modules are connected through a cascade connection, as illustrated in FIG. 8, by means of causing the first sixteen bits of data to reflect an output of the light-receiving element 121 and causing the remaining bits of data to reflect the state of serial input.

A scan time for scanning a photo-coupler module is equal to the sum total of the time required for reading received-light pattern data from sixteen elements and the time required for transferring latch data. For instance, provided that the time required for reading received-light pattern data from a single element assumes a value of 200 $\mu$sec, the time required for reading received-light pattern data from sixteen elements assumes a value of 3.2 msec. The sum total of a time of 3.2 msec and the time required for transferring sixteen latch data corresponds to a scan time for scanning a single photo-coupler module.

As mentioned previously, the light-emitting module 11 and the light-receiving module 12 are each divided into sixteen elements and the thus -divided elements are connected by a cascade connection so as to constitute a block. Accordingly, the present embodiment can transfer to a game board received-light pattern data during about the same time period as that required for scanning a single photo-coupler module. The received-light pattern detection apparatus 10 according to the present embodiment can reduce the read interval including a transfer time to a value of less than 16.6 ms.

The present invention can provide a received-light pattern detecting apparatus capable of reading received-light pattern data within a period of read interval of a video game, including a transfer time.

Further, the present invention is not limited to these embodiments, but variations and modifications may be made without departing from the scope of the present invention.

The entire disclosure of Japanese Patent Application No. Hei 11-332281 filed on Nov. 24, 2000 including specification, claims, drawings and summary are incorporated herein by reference in its entirety.

What is claimed is:

1. A received-light pattern detection apparatus for detecting a received-light pattern representing the position of an object existing in front of a monitor, comprising:

a plurality of light-receiving modules arranged around the periphery of the monitor while being connected in a cascade manner;

a plurality of light-emitting modules arranged around the periphery of the monitor so as to face the light receiving modules, wherein each of the light emitting modules comprises a plurality of light-emitting elements;

each of the light-receiving modules comprises a plurality of light-receiving elements, a latch circuit for latching a plurality of outputs generated by said light-receiving elements, a timing control circuit which makes the latch circuit to latch the outputs of the light-receiving elements one by one, and a shift register which transmits the latched outputs in a serial signal form after all outputs of said light-receiving elements are latched;

each of the light-receiving elements included in said light-receiving modules forms a photo-coupler with a light-emitting element included in said light-emitting module; and said shift register is connected in a cascade manner with a shift register which is included in an adjacent arranged light-receiving module and transmits serial signal transmitted from a shift register of a former stage;

said received-light pattern detection apparatus further comprises an input/output interface which instructs said plurality of light-receiving modules at the same time to start latching said outputs and receives the serial signal transmitted from a shift register of the latest stage.

2. The received-light pattern detection apparatus according to claim 1, wherein the photo-couplers are arranged at an uniform interval of 10 mm or thereabouts.

3. A received-light pattern detection apparatus for detecting a received-light pattern representing the position of an object existing in front of a monitor, comprising:

a plurality of light-receiving modules arranged around the periphery of the monitor while being connected in a cascade manner;

a plurality of light-emitting modules arranged around the periphery of the monitor so as to face the light receiving modules;

wherein each of the light emitting modules comprises a plurality of light-emitting elements;

each of the light-receiving modules comprises a plurality of light-receiving elements, a latch circuit for latching a plurality of outputs generated by said light-receiving elements, a timing control circuit which makes the latch circuit to latch the outputs of the light-receiving elements one by one, and a shift register which transmits the latched outputs in a serial signal form after all outputs of said light-receiving elements are latched;

each of the light-receiving elements included in said light-receiving modules forms a photo-coupler with a light-emitting element included in said light-emitting module; and said shift register is connected in a cascade manner with a shift register which is included in an adjacent arranged light-receiving module and transmits serial signal transmitted from a shift register of a former stage;

said received-light pattern detection apparatus further comprises an input/output interface which instructs said plurality of light-receiving modules at the same time to start latching said outputs and receives the serial signal transmitted from a shift register of the latest stage, wherein the input/output interface converts the serial signal received from the shift register of the latest stage into a switch packet and transmits the switch packet to a host, and data transmission between said input/output interface and said host is performed through use of a JVS communication protocol.

* * * * *